Figure 19:
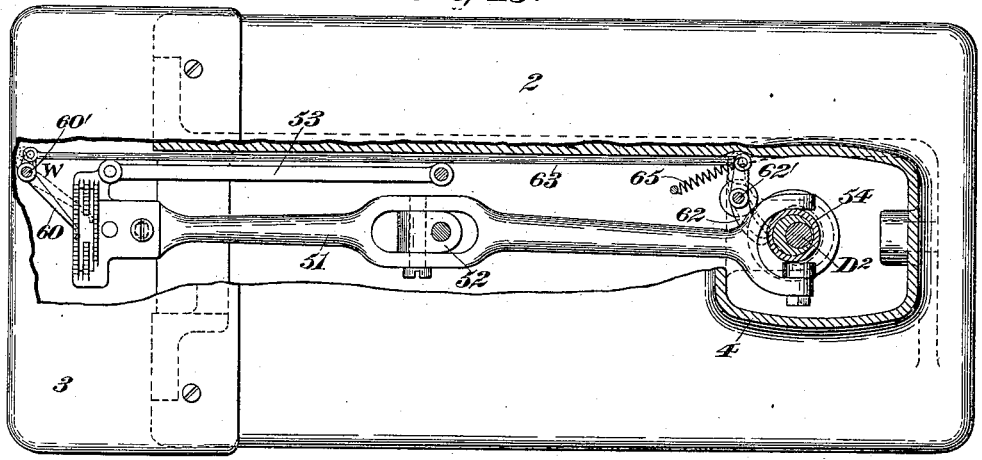

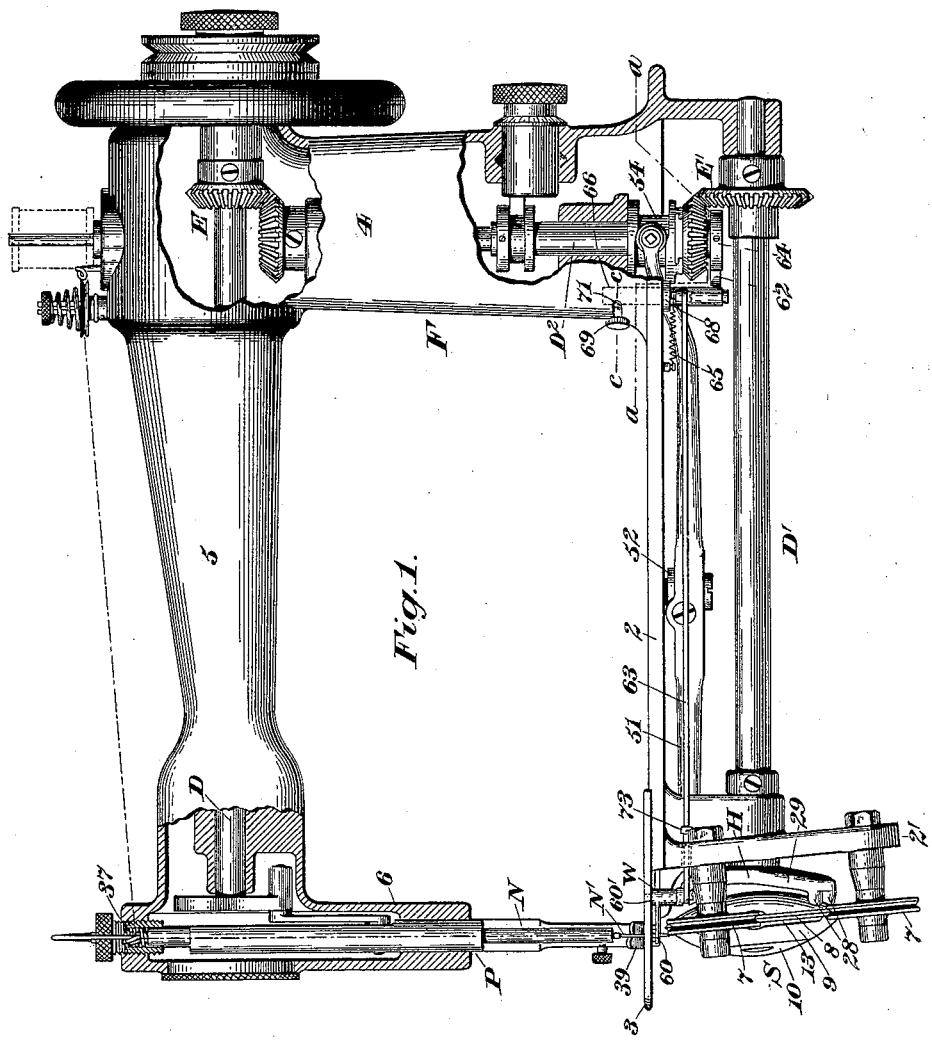

No. 607,079. Patented July 12, 1898.
H. P. RICHARDS.
SEWING MACHINE.
(Application filed Aug. 4, 1897.)
(No Model.) 5 Sheets—Sheet 2.
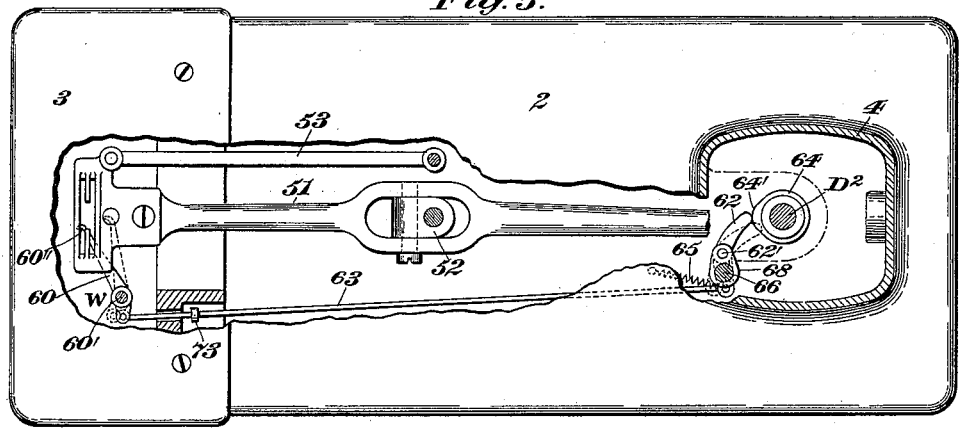
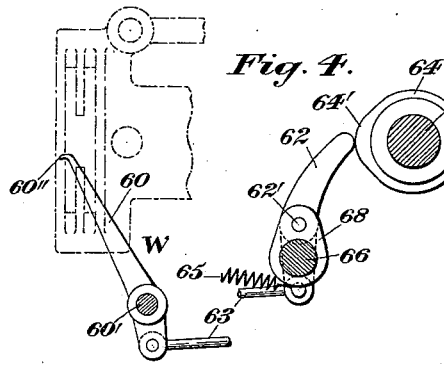 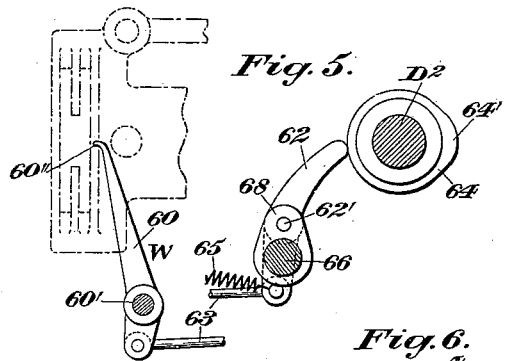
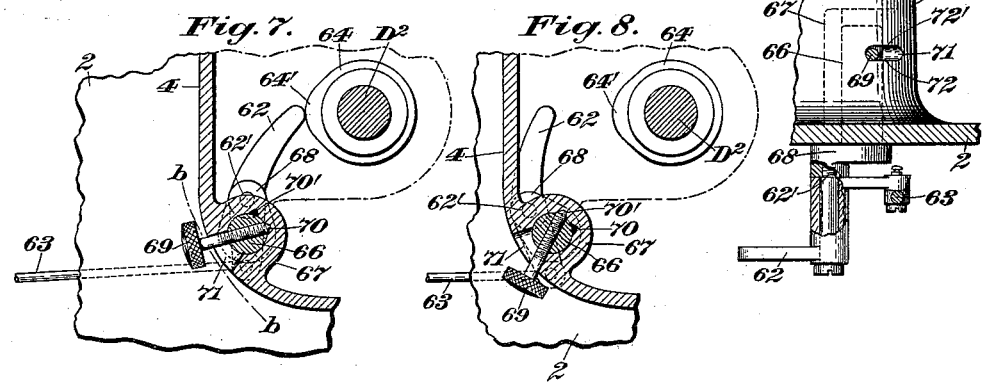
Witnesses: Inventor:
J. L. Edwards Jr. H. P. Richards
Fred. J. Dole.

No. 607,079. Patented July 12, 1898.
H. P. RICHARDS.
SEWING MACHINE.
(Application filed Aug. 4, 1897.)
(No Model.) 5 Sheets—Sheet 3.
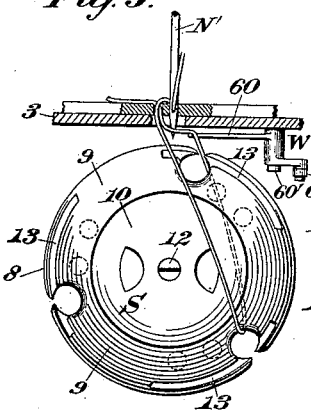
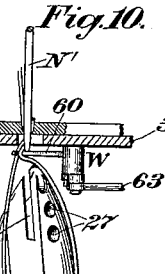
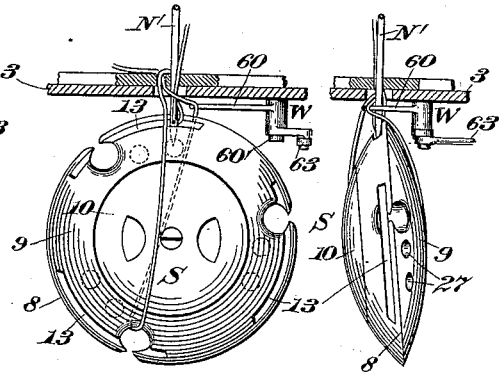
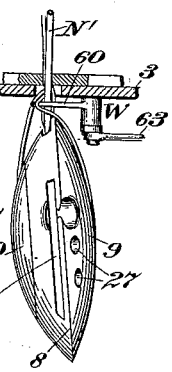
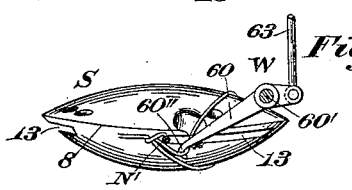
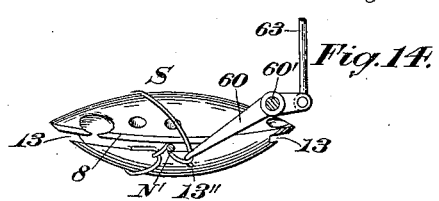
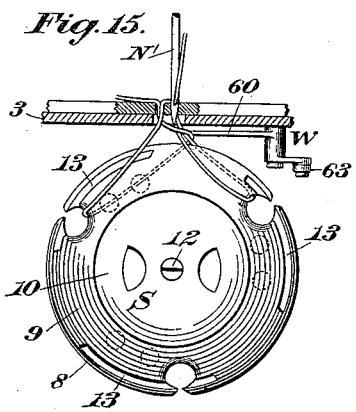
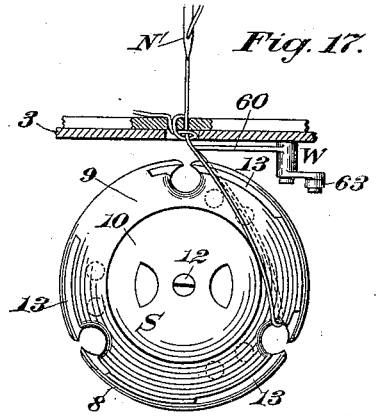
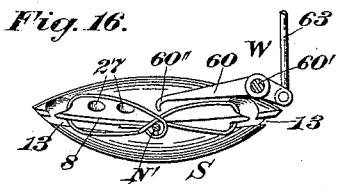
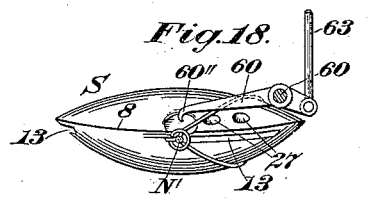
Witnesses:
J. L. Edwards Jr.
Fred. J. Dole.
Inventor:
H. P. Richards No. 607,079. Patented July 12, 1898.
H. P. RICHARDS.
SEWING MACHINE.
(Application filed Aug. 4, 1897.)
(No Model.) 5 Sheets—Sheet 4.

Witnesses:
J. L. Edwards Jr.
Fred. J. Dole.

Inventor:
H. P. Richards.

No. 607,079. Patented July 12, 1898.
H. P. RICHARDS.
SEWING MACHINE.
(Application filed Aug. 4, 1897.)
(No Model.) 5 Sheets—Sheet 5.
Fig. 22.
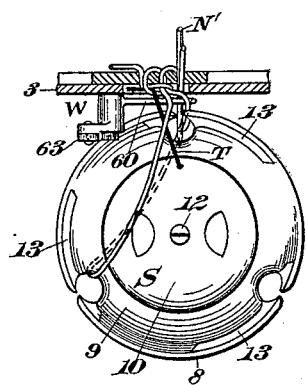
Fig. 23.
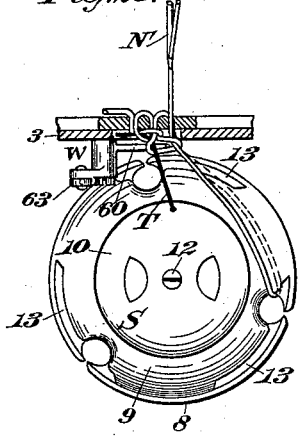
Fig. 24.
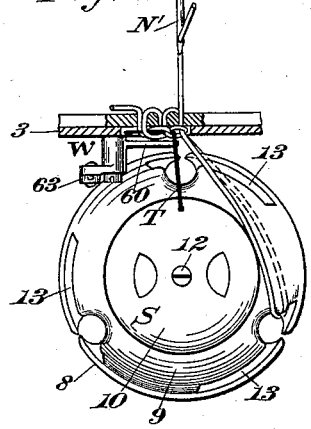
Fig. 25.
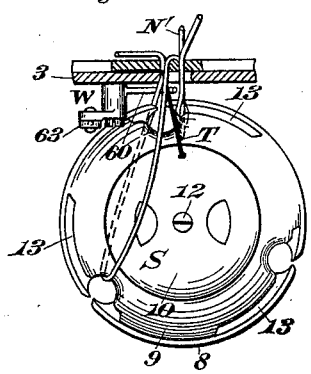
Fig. 28.
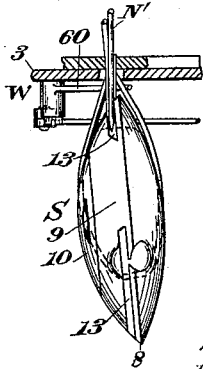
Fig. 29.
Fig. 26.
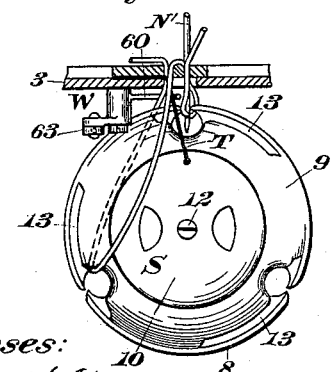
Fig. 27.
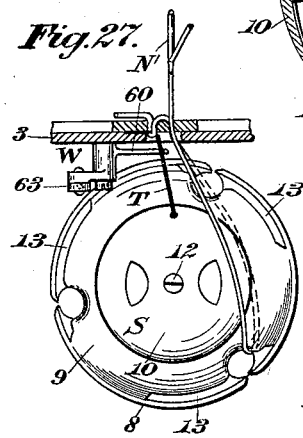
Witnesses:
J. L. Edwards Jr.
Fred. J. Dole.
Inventor:
H. P. Richards.

UNITED STATES PATENT OFFICE.

HUBERT P. RICHARDS, OF NEW BRITAIN, CONNECTICUT.

SEWING-MACHINE.

SPECIFICATION forming part of Letters Patent No. 607,079, dated July 12, 1898.

Application filed August 4, 1897. Serial No. 647,085. (No model.)

*To all whom it may concern:*

Be it known that I, HUBERT P. RICHARDS, a citizen of the United States, residing at New Britain, in the county of Hartford and State of Connecticut, have invented certain new and useful Improvements in Sewing-Machines, of which the following is a specification.

This invention relates to sewing-machines, and it has special reference to that class of sewing-machines known as "lock-stitch" machines, in which the stitch mechanism includes a reciprocatory needle, a rotary looper adapted for carrying successive loops, and means for reciprocating the needle and rotating the looper constantly in one direction, whereby the loop of the needle-thread will be engaged by and carried entirely around the looper to inclose a lower thread to form a lock-stitch.

In machines of this class as heretofore constructed and organized no means have been provided, so far as I am aware, whereby different kinds of stitches could be formed without changing the direction of movement or mode of operation of one or more of the parts of the sewing-machine mechanism or without removing the lock-stitch-forming looper or shuttle and substituting therefor a looper or equivalent device comprehending means whereby a different manipulation of the thread may be effected.

One object of my present invention is to provide, in connection with the fabric-holding and fabric-feeding devices of a sewing-machine, a differential stitch-forming mechanism embodying instrumentalities normally operative for forming a lock-stitch and also embodying a stitch-changing device shiftable into position to engage successive loops and to so act thereon as to effect a change in the form of stitch made.

A further object of the invention is to provide, in connection with stitch-forming mechanism including a reciprocatory needle and a looper operating normally to form a lock-stitch, a device shiftable independently of the looper into position for so manipulating successive loops as to compel each succeeding loop to pass through a preceding loop, and thereby cause the stitch mechanism to form a chain-stitch.

A further object of the invention is to provide, in connection with fabric-holding and fabric-feeding devices of a sewing-machine, stitch-forming mechanism comprising a reciprocatory needle, a rotary looper having a series of loop-takers, means for imparting comparative movements of predetermined velocities to the needle and looper, whereby successive loops may be formed and carried around the looper to inclose a lower thread and form a lock-stitch, a stitch-changing device located intermediate the looper and fabric-holder in position to divert the upper portions of successive loops in such manner that each succeeding loop may pass through a preceding loop and cause a chain-stitch to be formed, and actuating means in connection with said stitch-changing device and timed and operating with respect to the looper to advance said device to a loop-diverting position immediately after the loop has arrived at its "fully-drawn-out" position and to retract said stitch-changing device to an ineffective position immediately preceding the arrival of the loop at its "retightening" position, or at that point where it is retightened on the looper by the descent of the needle through and below the fabric.

For convenience my present invention is herein shown developed in a machine such as described in Letters Patent of the United States No. 574,573, granted Francis H. Richards January 5, 1897, to which reference may be had; but, as will be obvious, the invention is applicable to various kinds of sewing-machines.

Figure 20:
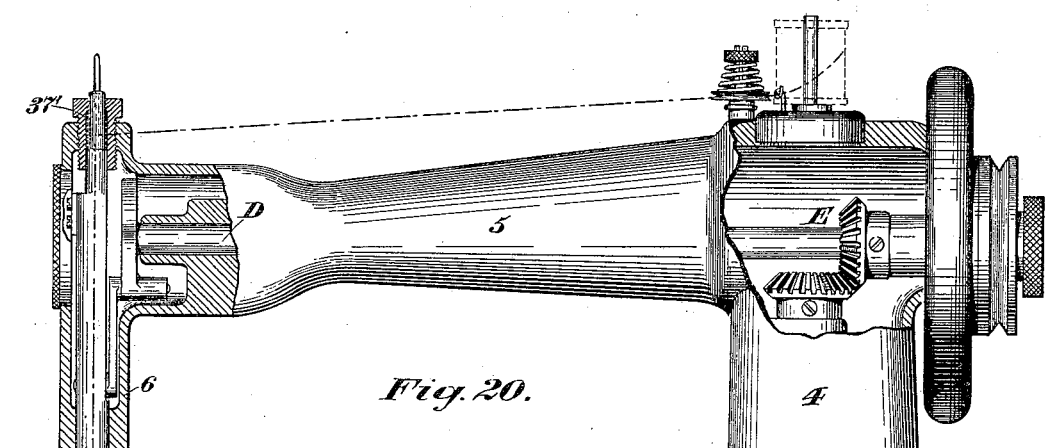
Figure 21:
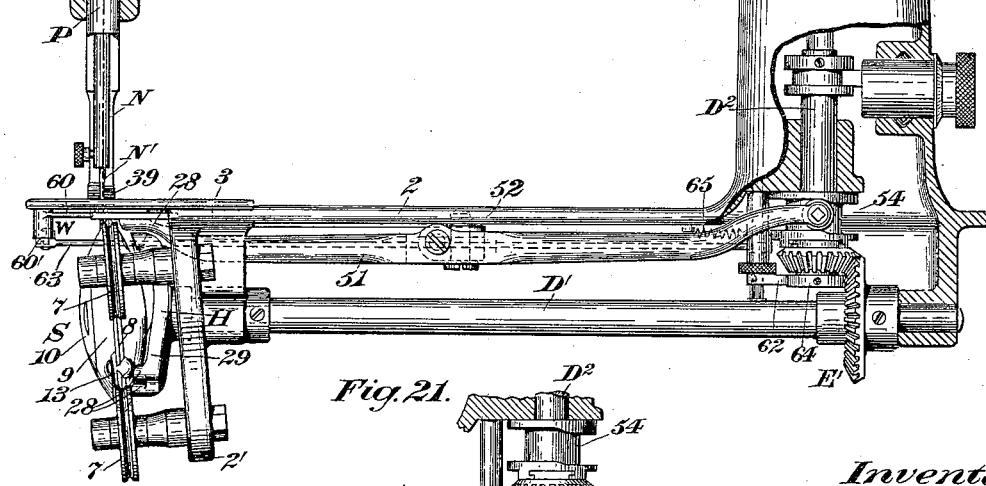

In the drawings accompanying and forming part of this specification, Figure 1 is a side elevation, partially in section, of a sewing-machine embodying my present invention. Fig. 2 is an end view of the machine as seen from the left hand in Fig. 1. Fig. 3 is a horizontal section of a portion of the lower part of the machine, taken in a line corresponding with the dotted line *a a*, Fig. 1, a portion of the bed-plate and the feed-lever being broken away and illustrating the stitch-changing device and a cam for operating the same, the looper and its driver not being shown. Fig. 4 is a sectional plan view, on a relatively large scale, of the stitch-changer or loop-diverter, illustrating the same in its loop-engaging position, a portion of the fabric-feeding device being shown in dotted lines, the middle portion of said loop-diverting device being broken away and the two extreme end portions thereof brought into close relation to save space. Fig. 5 is a similar view to Fig. 4 of the stitch-changing device, showing the same in its retracted or ineffective position. Fig. 6 is a sectional elevation, on an enlarged scale, of a portion of the stitch-changing device, taken in a line corresponding with the dotted line $b\,b$, Fig. 7, as seen from the left hand in said figure, and illustrating one form of means for throwing the stitch-changing device into and out of operative position and for locking said device in either of said positions. Figs. 7 and 8 are horizontal sections, each on a relatively large scale, of a portion of the sewing-machine frame, taken in a line corresponding to the dotted line $c\,c$, Fig. 1, said figures showing the stitch-changing device in operative and inoperative positions, respectively. Fig. 9 is a sectional side view of a portion of the stitch-forming mechanism detached, illustrating one loop as having been formed and carried around the looper to its fully-drawn-out position and showing an upper portion of the loop as engaged by the stitch-changing device and deflected laterally of the needle-path, and also showing the needle with its point just passing through the fabric. Fig. 10 is a front view of the parts illustrated in Fig. 9, showing said parts in corresponding positions. Fig. 11 is a plan view of the looper and stitch-changing device, partially in section, showing said parts in the positions thereof illustrated in Figs. 9 and 10. Figs. 12, 13, and 14 are views corresponding to Figs. 9, 10, and 11, respectively, of the same parts and show the loop carried around the looper to its "greatest-slack" position and the stitch-changing device as having been retracted, the needle in the position of the parts holding the deflected portion of the loop in a position to permit the succeeding loop just formed to pass through the preceding loop when engaged by the loop-taker of and carried around by the looper. Figs. 15 and 16 are side and plan views similar to Figs. 9 and 11 of the same parts, showing a succeeding loop as having been carried through a preceding loop by the looper. Figs. 17 and 18 are side and plan views similar to Figs. 15 and 16 of the same parts, showing the second loop as carried around the looper to nearly its fully-drawn-out position and the first loop as having been drawn up to complete a stitch. Fig. 19 is a sectional plan view similar to Fig. 3, showing a modified organization of stitch-changing device and a modified form of throw-out and locking device in connection therewith, said figure showing the stitch-changing device located in the rear of the feed-lever and illustrating by full and dotted lines two extreme positions of said device. Fig. 20 is a side elevation, partially in section, of the sewing-machine, showing the stitch-changing device in the modified organization thereof illustrated in Fig. 19. Fig. 21 is a detail, partially in section, illustrating the operation of the modified form of throw-out device shown in Figs. 19 and 20. Figs. 22, 23, and 24 are sectional side views of portions of the stitch-forming devices, including the stitch-changing device illustrated in Figs. 19 and 20, showing three successive positions of said parts during the formation of a lock-chain stitch. Figs. 25, 26, and 27 illustrate in sectional side views three different positions of the looper and needle shown in Figs. 22, 23, and 24 during the formation of an ordinary lock-stitch, the stitch-changing device having been thrown out of an operative and locked in an inoperative position. Fig. 28 is a front view of the parts shown in Fig. 25, and Fig. 29 is a cross-sectional view of the looper and a side view of the driver in connection therewith.

Similar characters designate like parts in all the figures of the drawings.

In the drawings only so much of a sewing-machine is shown as is deemed necessary for clearly illustrating the application and mode of operation of my present improvements.

Briefly stated, the sewing-machine illustrated in the drawings comprises a framework, (designated in a general way by F,) which may be of any suitable construction, for carrying the working parts of the machine; a vertical reciprocatory needle-bar N, carrying a needle N'; a horizontal needle-bar-actuating shaft D, journaled in suitable bearings in the framework and operatively connected with the needle-bar; a rotary looper S, peripherally supported at an inclination to the path of movement of and below the needle-bar, preferably by means of track-rolls 7, mounted on suitable studs or carriers connected with a bracket constituting a part of the framework of the machine; a horizontally-disposed looper-actuating shaft D'; a rotary driver H, carried by said shaft in position and adapted for engaging and rotating the looper; an intermediate shaft $D^2$, operatively connecting the needle-bar-actuating shaft D and looper-actuating shaft D'; a train of gears E, connecting the intermediate shaft $D^2$ and needle-bar-actuating shaft D; a train of gears E', connecting the intermediate shaft $D^2$ and looper-actuating shaft D'; fabric-feeding mechanism supported intermediate the needle-bar-actuating shaft D and looper-actuating shaft D' and operatively connected with the intermediate shaft $D^2$; a stitch-changing device (designated in a general way by W) shiftable into coöperative relation with the looper and adapted during the operation of the looper and needle mechanism for deflecting successive loops laterally of the path of the needle in such manner that a different kind of stitch will be formed by the stitch mechanism, and means for actuating the stitch-changing device at predetermined points in the movement of the looper and needle.

It is desired to state in the above connection that my present invention resides more particularly in the combination, with needle and looper mechanisms adapted for coöperation to form normally a lock-stitch, of means including a stitch-changing device coöperative with said mechanisms for effecting a change in the form of stitch made thereby; and it will be understood that my present invention is not limited to any particular construction or organization of needle and looper mechanisms, as it is applicable to sewing-machines having different kinds of said mechanisms, although it is preferable to use the invention in connection with the needle and looper mechanisms shown in the accompanying drawings, which are substantially the same as those described in Patent No. 574,573, hereinbefore referred to.

My present invention further resides in the special construction and organization of certain elements of a sewing-machine, as will be hereinafter fully described.

The framework F of the machine, which is shown of substantially the same general construction as the framework in the machine described in the patent hereinbefore referred to, comprises the horizontal bed-plate 2, having the bracket 2' and the removable throat-plate 3 at one end thereof, the hollow upright 4 at the opposite end of the bed-plate, the horizontal arm 5 above said bed-plate, and the vertical needle-bar-receiving head 6 at the outer or forward end of the arm 5.

The needle-bar N and presser-bar P are shown axially coincident, the needle-bar being supported for reciprocatory movement within the presser-bar, which is in turn supported for vertical movement in the head 6 and is furnished at its lower end with the presser-foot 39 and at its upper end with the resistance-spring 37 and adjusting means for regulating the pressure of the presser-foot upon the fabric.

The rotary looper S in the preferred form thereof shown in the accompanying drawings is, except in some particulars hereinafter described, similar in a general way to the discoidal loop-taker described in the patent hereinbefore referred to, and, as before stated, is peripherally supported on rolls 7 below the bed of the machine for rotary movement in a plane oblique to the path of movement of the needle, as most clearly shown in Fig. 1 of the drawings, said rolls frictionally engaging the edge or track 8 of the looper. This looper is shown comprising an annularly-recessed or cup-shaped member 9, which member constitutes the looper proper and has an inwardly-projecting stem or hub 9', a cap 10, having a tubular hub 10', encircling the hub 9' and constituting a support for the cop or bobbin of the lower thread, and a detent 12, shown in the nature of a split pin, extending into the hub 9' and removably holding the parts in their assembled positions. (See Fig. 29.) The looper has a series of circumferentially-disposed needle-receiving grooves 13 formed therein at one side (the outer side) of the loop-takers, and also has formed therein at the opposite side of said loop-takers (on the inner side of the looper) a series of driver-sockets 27, herein shown as six in number, arranged in three pairs, said pairs being preferably concentric to the axis of the looper and equidistantly disposed relatively to each other, as clearly shown by dotted lines in Fig. 2 of the drawings, and which sockets are adapted for receiving corresponding driving-pins 28 upon the driving-arms 29 of the shuttle-driver H, as will be hereinafter more fully described.

By supporting the looper in a plane oblique to the path of movement of the needle and by forming the needle-receiving grooves in said looper outside the path of movement of the loop-takers or hooks the needle during the operation of sewing will enter the looper in close proximity to the outside face of the loop-takers and pass inward in a plane divergent with respect to the plane of said looper, each needle-receiving groove diverging with respect to the peripheral line of the looper from the periphery of said looper toward the center thereof instead of converging as in the patent hereinbefore referred to. In other words, the upper end of the looper projects toward instead of away from the needle-path and terminates before it crosses said path. This arrangement brings the loop-takers or hooks of the looper inside and in close proximity to the needle and in such position that the needle on the ascending movement thereof, after the loop has been formed, carries the loop inward with respect to and in a path intersecting the path of movement of said loop-takers and facilitates the engagement of the loop by said loop-takers. This construction of the looper and the organization thereof with respect to the needle whereby on the ascending movement of the needle the loop will be carried toward and in a plane intersecting the path of the loop-takers is of material importance, as it obviates the possibility of a loop being missed by a loop-taker, as might be the case if the loop were carried by the needle a gradually-increased distance sidewise of the path of the loop-taker as the needle ascends. Furthermore, by forming the needle-grooves 13 in the outer face of the looper instead of in the inner face thereof, as in the patent hereinbefore referred to, more metal is left for forming the driver-sockets in the inner face of the looper.

The feed mechanism for the sewing-machine, which feed mechanism is for convenience shown of substantially the same general construction and organization as that described in the patent hereinbefore referred to, comprises a feed-dog extending through the throat-plate 3, a feed-lever 51, supporting said feed-dog and pivotally carried for vertical and horizontal oscillation on a bracket or feed-lever carrier 52, a link 53, pivoted at one end to the throat-plate of the sewing-machine and pivotally connected at its opposite end to the feed-dog and adapted for maintaining the feed-dog in substantial parallelism with the line of its longitudinal movement, and a feed-lever-actuating cam 54 in adjustable rotative connection with the intermediate shaft $D^2$ and adapted for actuating said feed-lever.

The driving or actuating mechanism for the needle-bar, looper, and feed device of the sewing-machine is shown of substantially the same general construction and organization as that described in the patent hereinbefore referred to and practically comprises a unitary mechanism consisting of a train of three coöperatively-connecting actuating devices, one of which constitutes an actuator for the needle-bar, another for the looper, and another for the feed device, and all of which coöperate to effect a predetermined comparative relation of movement between said needle-bar, looper, and feed device, reference being had to the aforesaid patent for a more complete description of said mechanisms.

As a means for directly actuating the looper from the horizontal shaft $D'$ and for holding said looper in fixed peripheral relation with the track-rolls and concentric to a fixed axis of rotation and prevent radial movement of said looper when the hook-openings come contiguous to a track-roll during the rotation of the looper I have provided, in connection with the shaft $D'$, a looper-supporting driver H, which driver in the form thereof shown has a series of radially-disposed arms 29, each having at the free end thereof two outwardly-projecting looper driving and supporting pins 28, the pins of the arms of the driver being adapted for successively engaging in the corresponding driver-sockets 27 of the looper for rotating the same and for maintaining said looper against lateral or vibratory movement, the construction and mode of operation of this driver being substantially the same as that described in the patent hereinbefore referred to.

For securing the proper ratio of movement between the three-hook looper and the needle the intermediate shaft is connected to the needle-bar-actuating shaft by a "one-to-one" train of gears and is connected to the looper-actuating shaft by a "two-to-three" train of gears.

Any usual or suitable tension devices may be employed for regulating the tension of the upper and lower threads.

Inasmuch as the operation of the needle, looper, and feed mechanisms in the present machine in forming a lock-stitch is in all essential parts the same as that of the machine described in the patent hereinbefore referred to a detailed description of this operation is deemed unnecessary, it being sufficient to say that in forming a lock-stitch the successive loops L are formed on the descending movements of the needle, are successively engaged by the successive loop-takers of the looper, and carried around said looper during the rotation thereof to inclose the lower thread T and form a lock-stitch, each preceding loop being drawn up by a succeeding loop as said succeeding loop is carried around and drawn out during the rotation of the looper, as will be readily understood by a comparison of Figs. 25 to 27 of the drawings.

In the organization of mechanism shown in the accompanying drawings the looper S will be constantly rotated during the operation of sewing in one direction, preferably in the direction of the arrow in Fig. 2 and toward the front side of the machine.

As a convenient and simple means for changing the form of stitch resulting from the normal operation of the needle and looper mechanism, hereinbefore described, without effecting a change in the direction of movement of the looper or feed device or in the mode of operation of the several lock-stitch-forming mechanisms—to wit, the looper mechanism, the needle mechanism, and the feed mechanism—I have provided a stitch-changing device (designated in a general way by W) shiftable into a position for coöperating with the looper and adapted for engaging upper portions of successive loops and deflecting said portions laterally of the path of the needle, so that succeeding loops may pass through preceding loops and cause the stitch-forming mechanism to produce a chain-stitch.

The construction and organization of the stitch-changing device is such that the same may be thrown into or out of operative relation with the looper arbitrarily to change the form of stitch made by the stitch mechanism without the necessity of changing the direction of rotation of the looper, the direction of movement of the feed mechanism, or without the removal and substitution of parts, as heretofore necessary in machines of ordinary construction.

It is desired to state in the above connection that the invention is not limited to the particular construction and organization of stitch-changing device illustrated in the accompanying drawings, as this may be variously modified within the purview of my invention, while adhering to a stitch-changing device that is independent of the looper and is shiftable into a position for so coöperating with said looper and for so manipulating successive loops as to effect a change in the form of stitch which would otherwise be produced by the stitch mechanism if such stitch-changing device were not provided.

The stitch-changing device W, in the preferred construction and organization thereof illustrated in Figs. 1 to 6, inclusive, of the drawings, comprises a loop-diverter 60, shown as a lever fulcrumed at 60' below the bed-plate of the machine for horizontal oscillation across the path of the loops, actuating means for the loop-diverter, herein shown as an actuating-lever 62, fulcrumed at 62', in close proximity to the intermediate shaft $D^2$, a connection 63 between the actuating-lever 62 and the loop-diverter 60, which connection is shown as a rod pivotally connected at opposite ends to said diverter and actuating-lever, respectively, a cam 64, fixed to the intermediate shaft D², and a spring 65, connected with the stitch-changing device and adapted for normally retaining the actuating-lever 62 in working engagement with the cam 64.

In Fig. 3 the stitch-changing device is shown located in advance of the feed mechanism, so that the loop-diverter 60 will engage the loop in advance of the needle. This loop-diverter, which, as above stated, is shown as a lever, is preferably furnished at one end thereof with a loop-engaging portion or hook 60″, which, during the operation of the stitch-changing device, engages the upper portion of the inner strand of the loop and forces the same sidewise and in advance of the path of movement of the needle, as clearly illustrated in Figs. 9 to 17, inclusive, of the drawings.

To secure the best results in the operation of the stitch-changing device, it is desirable that the loop-diverter 60 shall be advanced to engage and deflect the upper portion of the loop immediately after said loop has been carried to its fully-drawn-out position, as shown in Fig. 9, and shall be retracted and released from said portion of the loop just before the loop arrives at its retightening position, as shown in Fig. 12, or, in other words, the deflection of the upper portion of the loop should take place during the travel of the loop around the shuttle through its greatest slack position, or when sufficient slack thread exists in the loop proper to provide for the deflection of the upper portion of the loop without the necessity of drawing off more thread from above the needle-point. As a convenient means for effecting this end the cam 64 has a quick-acting portion 64′, which is so disposed upon the intermediate shaft that is connected to the looper-actuator and is so timed with reference to the movements of the looper that it will advance the stitch-changing device to its loop-diverting position immediately after the loop has arrived at its fully-drawn-out position and will effect the retraction of said device to an ineffective position immediately preceding the arrival of the loop at its retightening position.

It will be obvious that other instrumentalities than those illustrated in the drawings referred to may be employed for actuating the loop diverter or deflector. Therefore it will be understood that I do not desire to limit this invention to the particular means shown in the drawings for accomplishing this result.

It will also be understood that the cam 64 may be constructed to impart both advancing and retracting movements to the loop-diverter and that the spring 65, which in the present instance effects the retractive movement of the loop-diverter, might be dispensed with, although the construction illustrated in the drawings is preferable.

In the drawings (see Figs. 6 and 21) I have shown two different forms of means or throw-out devices for shifting the stitch-changing device to an inoperative position or to a position where it will have no action upon the successive loops as they are formed and carried around the looper. For convenience each throw-out device comprehends means whereby the actuating-lever 62 will be thrown out of operative relation with the primary actuator or cam 64.

The throw-out device, in the preferred form thereof shown most clearly in Fig. 6 of the drawings, comprises a stud 66, supported for rotative movement in a bearing 67 in parallelism with the intermediate shaft D² and having a crank-arm 68 on the lower end thereof on which the actuating-lever 62 is fulcrumed, said stud and crank-arm being rotatably adjustable to throw the fulcrum-point of said lever 62 toward or away from the axis of the cam 64 to bring the working end of said lever into engagement or out of operative relation with the working face of said cam, as will be understood by a comparison of Figs. 7 and 8 of the drawings, and as a means for locking the actuating-lever 62 in operative or inoperative relation, as desired, with the working face of the cam 64 a detent device 69 is provided, in connection with the stud 66, adapted for engaging the stop-faces 70 and 70′ on the interior of the bearing and for holding the stud in position in one or the other of its adjusted positions. This detent is shown in Figs. 7 and 8 as a set-screw extending through a slot 71, formed through one wall of the bearing and also extended through the transverse opening in the stud 66 and having its working end in position to engage the stop-faces 70 and 70′. The walls 72 and 72′ of the slot 71 constitute abutments for coöperating with the shank of the screw to limit the rotative adjustment of the stud 66, as will readily be understood by reference to the drawings referred to.

When it is desired to throw the stitch-changing device into an inoperative position to allow the stitch-forming mechanism of the machine to form a lock-stitch, the screw or detent 69 is thrown out of engagement with the stop-face 70 and shifted from the position shown in Fig. 7 to that shown in Fig. 8 and reëngaged with the stop-faces 70′, which throws the actuating-lever 62 with its working face out of operative relation with the actuating-cam 64, the retracting-spring 65 throwing the loop-diverter 60 to the position shown in Fig. 5 and out of operative relation with the loops.

For the purpose of limiting the retractive movement of the loop-diverter 60 when the actuating-lever 62 is in the position shown in Fig. 8 a stop 73 is provided.

In Figs. 20 and 21 the actuating-lever 62 is shown shiftable transversely of the path of movement of the actuating-cam 64, it being shiftable vertically into and out of operative engagement with the working face of said cam, a detent being provided for locking it in its operative or inoperative position. The construction and organization of the throw-out device may be varied without departure from this invention.

When it is desired to cause the stitch-forming mechanism to produce a chain-stitch, the stitch-changing device will be shifted, by means of the throw-out device, into the operative position shown in Fig. 3 of the drawings, with the actuating-lever thereof in operative engagement with the working face of the cam 64. During the rotation of the looper and reciprocation of the needle the working end of the loop-diverter 60 will be intermittently advanced and retracted by means of the cam 64, the actuating-lever 62, and the spring 65, it engaging and deflecting the upper portions of successive loops on its advancing movement, as shown in Fig. 9, and releasing said portions on its retractive movement, this movement taking place, preferably, when the loop is traveling through its greatest slack position, as before stated. On the engagement of the upper portion of the loop by the working end of the loop-diverter said portion will be thrown sidewise slightly in advance of the path of movement of the needle to allow said needle to enter the looper in the rear of the deflected portion of this loop, so that on the engagement of the succeeding loop by the loop-taker of the looper the deflected portion of the preceding loop will be in position to allow the bight of the succeeding loop to pass through said preceding loop, and thereby cause the stitch mechanism to form a chain-stitch.

It will be seen by reference to Figs. 12 to 14 that the loop-diverter releases the upper portion of the first loop while the needle is approximately in its lowest position and that on the release of said portion of the loop the needle will be in position to hold the same until the succeeding loop is engaged by the hook of the loop-taker and has carried the bight of the succeeding loop sufficiently far through the preceding loop as to prevent the accidental retraction of the deflected portion of said loop.

When it is desired to produce a lock-stitch by the stitch-forming mechanism, it is simply necessary to throw the stitch-changing device into an inoperative position, as shown, for instance, in Fig. 8, by means of the throw-out device, after which the stitch-forming mechanism will operate substantially in the same manner as described in the patent hereinbefore referred to.

In the organization thereof shown most clearly in Figs. 1 and 2 of the drawings the loop-diverter is located to operate between the upper end of the looper and the lower face of the bed-plate of the machine.

It will of course be understood that when a chain-stitch is made the lower thread normally carried by the looper will be dropped so as not to be engaged by the successive loops as they are formed, and that when it is desired to form a lock-stitch or a lock chain-stitch the end of the lower thread will be drawn up through the throat of the bed-plate in the usual manner.

Having described my invention, I claim—

1. The combination, with stitch-forming mechanism embodying a needle and a looper having means for carrying simultaneously successive loops, of an independently-operable stitch-changing device located in position to engage and hold a portion of one of said loops out of the path of the needle and in the path of the looper to thereby permit the next succeeding of said loops to pass through the preceding loop.

2. The combination, with lock-stitch mechanism embodying a rotary looper adapted for carrying two loops simultaneously, of means independent of the looper for engaging one loop and for holding the same in such position that the succeeding loop will, during the rotation of the looper, pass therethrough.

3. The combination, with lock-stitch-forming mechanism including a rotary looper having means for carrying successive loops, of an independently-shiftable stitch-changing device for diverting one of said loops transversely of the needle-path whereby the next loop will pass through the diverted loop and enable the mechanism to form a stitch, and means for shifting the stitch-changing device into and out from operative position.

4. In a sewing-machine of the class having a rotary looper carrying successive loops at the same time and also having needle mechanism and means for actuating the looper and needle mechanism, a stitch-changing device located in position and adapted for so deflecting one of the loops transversely of the needle-path at a predetermined point in the movement of the needle that the succeeding loop will be carried through the preceding loop, and means for actuating the stitch-changing device in proper time with the looper and needle.

5. The combination, with stitch-forming mechanism including a looper having a series of loop-takers or hooks, of an independent stitch-changing device operable for successively engaging successive loops and for diverting and holding an upper portion of each loop outward in advance of the vertical path of the needle until the bight of the next succeeding loop is formed and is carried below said stitch-changing device.

6. The combination, with stitch-forming mechanism including a rotary looper having a series of loop-takers or hooks, of means for engaging the upper portion of the first loop, after the same has been carried partially around the looper, and for throwing said portion forward and sidewise of the vertical path of the needle before a second loop is formed and engaged by the looper, and also adapted for retaining said loop in this position until the needle has descended to a position for preventing the retraction of the first loop, whereby the second loop will be carried by the looper through said first loop and thereby cause the stitch-forming mechanism to form a stitch.

7. The combination, with stitch-forming mechanism including a rotary looper having a series of loop-takers or hooks, of a stitch-changing device located to engage the upper portion of a first loop, after the same has been carried partially around the looper, and to throw said portion forward and sidewise of the vertical path of the needle before the second loop is formed and engaged by the looper, and also adapted to hold said first loop in this position until the bight of the second loop has been carried by the needle below and in the rear of this portion of said loop and in position to be carried through said first loop to thereby cause the stitch-forming mechanism to complete a chain-stitch; and means for throwing the stitch-changing device into an ineffective position to enable said mechanism to form a lock-stitch.

8. The combination, with stitch-forming mechanism embodying a reciprocatory needle, a rotary looper having a series of loop-takers or hooks, and means for actuating the needle and looper in consonance, of a stitch-changing or loop-diverting device shiftable into engagement with, and adapted for diverting a portion of a first loop from, its normal course so that the looper will carry a second loop through said first loop and thereby form a chain-stitch, and shiftable into an ineffective position to enable the stitch-forming mechanism to form a lock-stitch.

9. In a sewing-machine, the combination, with lock-stitch-forming mechanism including a reciprocatory needle and a looper having a series of peripheral loop-takers, of a stitch-changing device supported for rocking movement independent of the looper in juxtaposition to the path of movement of the needle; and means for actuating the stitch-changing device, during the descent of the needle, to cause the same to engage the upper portion of the loop and carry said portion forward to a point in advance of, and slightly at one side, the vertical path of said needle, and thereby permit a succeeding loop to pass through a preceding loop.

10. In a sewing-machine, the combination, with fabric-holding and fabric-feeding devices, of stitch-forming mechanism comprising a reciprocatory needle, a rotary looper having a series of loop-takers, and means for imparting comparative movements of predetermined velocities to the needle and loop-taker, whereby successive loops will be formed and carried around the loop-taker; a stitch-changing device shiftable into position for diverting the upper portions of successive loops in such manner that each succeeding loop will pass through a preceding loop; and actuating means in connection with, and timed and operating with respect to the looper to impart a loop-diverting movement to, said stitch-changing device during the travel of the loop from its fully-drawn-out position to its greatest-slack position.

11. In a sewing-machine, the combination, with fabric-holding and fabric-feeding devices, of combined lock-stitch and chain-stitch mechanism comprising a reciprocatory needle, a rotary looper having a series of loop-takers, and means for imparting comparative movements of predetermined velocities to the needle and loop-taker, whereby successive loops may be formed and carried around the loop-taker to inclose a lower thread and form a lock-stitch; a stitch-changing device located intermediate the loop-taker and fabric-holder in position to divert the upper portions of successive loops in such manner that each succeeding loop will pass through a preceding loop; and actuating means in connection with the stitch-changing device and timed and operating with respect to the looper to impart a loop-diverting movement to said device during the travel of the loop from its fully-drawn-out position to its greatest-slack position.

12. In a sewing-machine, the combination, with fabric-holding and fabric-feeding devices, of stitch-forming mechanism comprising a reciprocatory needle, a rotary looper having a series of loop-takers, and means for imparting comparative movements of predetermined velocities to the needle and looper, whereby successive loops may be formed and carried around the looper to inclose a lower thread and form a lock-stitch; a stitch-changing device located intermediate the looper and fabric-holder in position to divert the upper portions of successive loops in such manner that each succeeding loop may pass through a preceding loop and cause a chain-stitch to be formed; and actuating means in connection with said stitch-changing device and timed and operating with respect to the looper to advance said device to a loop-diverting position immediately after the loop has arrived at its fully-drawn-out position, and to retract said stitch-changing device to an ineffective position immediately preceding the arrival of the loop at its retightening position.

13. The combination, with fabric-holding and fabric-feeding devices, of reciprocally-effective lock-stitch and chain-stitch mechanisms, the former of which comprises a reciprocatory needle, a rotary shuttle having a series of loop-takers, and means for rotating the shuttle and reciprocating the needle in consonance whereby loops will be formed and carried around the shuttle to inclose the lower thread and form a lock-stitch, and the latter of which comprises a stitch-diverter shiftable into position for deflecting successive loops laterally of the path of the needle so that each succeeding loop will pass through a preceding loop and thereby coöperate with the lock-stitch mechanism to form a chain-stitch.

14. The combination, with fabric-holding and fabric-feeding devices and with needle and looper mechanism, of an oscillatory loop-diverter pivotally supported between the looper and feed-lever for movement crosswise of the path of said looper, and means in connection with the looper mechanism for actuating said stitch-diverter at predetermined points in the rotation of the looper.

15. In a sewing-machine, the combination, with a reciprocatory needle and a rotary looper and actuating mechanism therefor and with a feed-lever and actuating mechanism therefor, of a stitch-diverting lever pivotally supported on the bed of the machine for oscillatory movement between the looper and feed-lever; a cam operative with the looper-actuating mechanism; an actuating-lever in operative relation with said cam; and a connection between said actuating-lever and loop-diverting lever.

16. The combination, with lock-stitch-forming mechanism, of a stitch-changing device comprising an oscillatory loop-diverter pivotally supported in position for movement crosswise of the path of the looper and means controlled by the lock-stitch mechanism for advancing and retracting the stitch-diverter at predetermined points in the rotative movement of the looper, whereby upper portions of successive loops will be deflected sidewise of the path of the needle and in position to cause each succeeding loop to pass through a preceding loop.

17. In a sewing-machine, the combination, with lock-stitch mechanism, of a stitch-changing device located in position to engage upper portions of successive loops and deflect said loops so as to cause succeeding loops to pass through preceding loops; means for actuating said stitch-changing device; and a throw-out device in operative connection with, and effective for holding the stitch-changing device in an operative or an inoperative position arbitrarily with respect to, the looper.

18. The combination, with lock-stitch mechanism, of an oscillatory loop-diverter pivotally supported above, and in close proximity to, the looper; an actuating-cam in connection with the lock-stitch mechanism; an actuating-lever in operative connection with the loop-diverter; and a throw-out device on which said lever is fulcrumed, said throw-out device being adapted for shifting the lever into and out of operative relation with the actuating-cam.

HUBERT P. RICHARDS.

Witnesses:
F. N. CHASE,
ANDREW FERGUSON.